United States Patent [19]

Farrar et al.

[11] Patent Number: 4,973,364

[45] Date of Patent: Nov. 27, 1990

[54] PROCESS FOR THE MANUFACTURE OF A SUBSTANTIALLY WRINKLE-FREE NON-PLANAR LAMINATE AND PRE-LAMINATE

[75] Inventors: Grover L. Farrar, Greenville; H. Wayne Swofford, Taylors; Jack M. Lazar, Greenville; Samuel M. Inman, Greenville; Stephen J. Gust, Greenville, all of S.C.

[73] Assignee: Hoechest Celanese Corporation, Somerville, N.J.

[21] Appl. No.: 299,583

[22] Filed: Jan. 23, 1989

Related U.S. Application Data

[62] Division of Ser. No. 148,818, Jan. 27, 1988, abandoned.

[51] Int. Cl.$^5$ .............................. B29C 51/14
[52] U.S. Cl. ...................... 156/84; 156/85; 156/212; 156/245; 156/267; 156/285; 156/289; 264/230; 264/342 R
[58] Field of Search ............... 156/84, 85, 212, 213, 156/229, 245, 285, 267, 289; 264/230, 231, 259, 342 R

[56] References Cited

U.S. PATENT DOCUMENTS

| | | | |
|---|---|---|---|
| 2,828,799 | 4/1958 | Harrison | 156/84 |
| 2,897,546 | 8/1959 | Clapp et al. | 156/85 |
| 3,453,161 | 7/1969 | Golightly . | |
| 3,626,053 | 12/1971 | Hofer | 264/230 |
| 3,673,295 | 1/1972 | Winchklhofer | 156/84 |
| 3,846,200 | 11/1974 | Doerflung et al. | 156/85 |
| 3,900,673 | 8/1975 | Mattimoe et al. . | |
| 4,242,403 | 12/1980 | Mattimoe et al. . | |
| 4,248,647 | 2/1981 | Herron et al. | 156/84 |
| 4,501,546 | 2/1985 | Valimont et al. . | |
| 4,592,717 | 6/1986 | Albert : | |

*Primary Examiner*—Caleb Weston
*Attorney, Agent, or Firm*—Gregory N. Clements

[57] ABSTRACT

A substantially wrinkle-free, high modulus, thermoplastic film having at least one compound curve is disclosed. The substantially wrinkle-free film may form a part of a laminate which itself has utility in automotive glazing applications.

An improved lamination process is also disclosed for the production of non-planar laminates from planar sheets of heat-shrinkable films through the use of a negative image mold of the non-planar article to be laminated. Heat-shrinkable films which may be used in the practice of the invention include polyester films, polyolefin films, polyamide films, polyurethane films, polycarbonate films, polyvinylchloride films, and polystyrenic films.

The method is applicable to a wide range of non-planar articles and is particularly suitable to articles having at least one compound curve forming at least part of its surface. The improved lamination process of the present invention has specific utility in the manufacture of automotive glazing products such as windshields and rear windows.

27 Claims, No Drawings

PROCESS FOR THE MANUFACTURE OF A SUBSTANTIALLY WRINKLE-FREE NON-PLANAR LAMINATE AND PRE-LAMINATE

This is a division of application Ser. No. 07/148,818 filed Jan. 27, 1988, now abandoned.

BACKGROUND OF THE INVENTION

The present invention relates to a substantially wrinkle-free, non-planar thermoplastic film, and to a process for the manufacture of such film. More particularly, the present invention relates to a process for conforming a heat-shrinkable thermoplastic film having a high modulus of elasticity to the shape of a non-planar article without substantial formation of wrinkles in the conformed film. The process of the present invention is particularly suitable for the manufacture of automotive glazing and other transparent articles where optical clarity is important.

The construction and manufacture of automotive glazing products such as windshields, rear windows, sun roof panels, etc. is well known. One of the simpler glazing products may comprise a flexible interlayer of polyvinylbutyral sandwiched between a pane of glass on one side and a high modulus film, for example, polyester film, on the opposite side. This laminate is typically formed by assemblying the component layers and applying heat and/or pressure to permanently bond the layers together. European Patent No. 138,633 proposes an improved lamination process in which several "stacks" of components are simultaneously laminated.

Many automotive glazing products are not planar. Instead, the shapes of these products are becoming increasingly more complex in order to satisfy both aesthetic and aerodynamic demands of the automotive marketplace. While such curved automotive glazing products may satisfy certain aesthetic tastes and help minimize the overall wind resistance of the vehicle, they are extremely difficult to mass produce.

One source of difficulty relates to the production of high optical quality curved glass panels from commercial plate glass. Typically, such curved glass panels are manufactured by bending a pair of planar glass sheets as a pair so that their shapes conform to one another throughout the entire extent of the glass. A tunnel-like lehr is employed to heat the pair of glass sheets in unison to conform to the shaping surface of a bending mold. The production capacity of the lehr usually determines the overall production capacity of an automotive glazing manufacturing line. J. Golightly, "Producing Bent Laminated Windshields," U.S. Pat. No. 3,453,161 (July 1, 1969) discloses a method by which the production capacity of such lehrs may be increased wherein each bending mold is loaded with two pairs of glass sheets instead of one pair.

Wrinkling of the flexible interlayer sheet during its placement between the curved glass panels can also present a significant problem to the automotive glazing manufacturers. J. Valimont et al, "Vacuum Mold For Making A Windshield Subassembly," U.S. Pat. No. 4,501,546 (Feb. 26, 1985) discloses the use of a shaped, rotable vacuum mold, having curved walls conforming to the shape of the curved glass panels, to place a flexible interlayer themoplastic sheet such as PVB onto a curved glass panel in proper orientation and aligment without wrinkling. This patent does not address the wrinkling and optical distortion problems associated with the use of films possessing a high modulus of elasticity ("high modulus films"), such as biaxially-oriented polyester film.

High modulus films, such as biaxially oriented polyethylene terephthalate film, may form part of a protective layer for the automotive glazing laminate. Unfortunately, such films do not easily conform to many of the automotive glazing product shapes to which such films must be laminated. Instead, such high modulus films typically wrinkle, with the amount of wrinkling being directly dependent upon the complexity of the shape of the desired automotive glazing product. The wrinkling problem has prevented commercial acceptance of high modulus films as components of non-planar glazing products.

One reference which expressly deals with shaping a film in two directions of curvature is directed to metallized polyester film applications. D. Albert, "End Retract Device For Completing Spherically Shaped Reflective Film," U.S. Pat. No. 4,592,717 (June 3, 1986) discloses an apparatus in which the end portions of the film to be stretched are permanently attached to flexible stretch blocks such that the film wraps over a surface of the blocks which can be bent to arc positions matching the arc of curvature at the ends of a frame which carries the film in its final spherical configuration. The stretch blocks are then forced to flex about a neutral axis such that the surface of the blocks move about fixed end points from a chord configuration to an arc configuration which matches that of the ends of the stretching frame.

BRIEF SUMMARY OF THE INVENTION

In one aspect, the present invention relates to a substantially wrinkle-free, high modulus, thermoplastic film having at least one compound curve.

In another aspect, the present invention relates to a process for the manufacture of a substantially wrinkle-free, conformed, high modulus thermoplastic film comprising:

(i) placing a heat-shrinkable, high modulus, thermoplastic film over a negative-image mold of a non-planar article;

(ii) conforming said film to the shape of said mold by heating said film to a temperature above its glass transition temperature while maintaining said film under dimensional restraint.

In another aspect, the present invention relates to a process for the manufacture of a substantially wrinkle-free, non-planar pre-laminate comprising:

(i) placing a heat-shrinkable, high modulus, thermoplastic film over a negative-image mold of a non-planar article;

(ii) conforming said film to the shape of said mold by heating said film to a temperature above its glass transition temperature while maintaining said film under dimensional restraint, thereby forming conformed film;

(iii) placing an adhesive layer over said conformed film;

(iv) conforming and laminating said adhesive layer to the shape of said conformed film by means of heat and pressure, thereby forming a two layer pre-laminate.

Finally, a preferred embodiment of the present invention relates to process for the manufacture of a non-planar laminate comprising:

(i) placing a heat-shrinkable, thermoplastic film over a negative-image mold of a non-planar article;

(ii) conforming said film to the shape of said mold by heating said film to a temperature above its glass transition temperature while maintaining said film under dimensional restraint, thereby forming conformed film;

(iii) aligning the exposed surface of said conformed film into image-wise relationship with the concave surface of said non-planar article;

(iv) placing an adhesive layer between said conformed film and said non-planar article, thereby forming a pre-laminate;

(v) subjecting said pre-laminate to heat and pressure sufficient to laminate said conformed film, said adhesive layer, and said non-planar article together.

DETAILED DESCRIPTION OF THE INVENTION

Any heat-shrinkable, high modulus film may be employed in the practice of the present invention. As used herein, "heat-shrinkable film" means a thermoplastic film which, when exposed to elevated temperatures in the absence of dimensional restraint, will shrink.

"Modulus of Elasticity" is a measure of the force required to bend a material. As is well known, the modulus of elasticity of a given thermoplastic film is dependent upon its chemical composition, its molecular weight, and the degree of stretching the film is subjected to during its manufacture. For the purposes of this invention, a "high modulus" film means a thermoplastic film whose modulus of elasticity is sufficiently high that the film will wrinkle rather than readily conform itself to the shape of a non-planar article. Heat-shrinkable, high modulus films are well-known and can include polyester films, polyolefin films, polyvinyl chloride films, polycarbonate films, polyamide films, polyurethane films, and polystyrenic films. Heat-shrinkable, high modulus polyester film is preferred.

The process of the present invention is applicable to any non-planar article which may be itself employed to manufacture a convex shaped, negative image mold of itself. The process is believed most suitable to non-planar articles possessing a compound curvature. By "compound curvature" it is meant a surface which is curved in two directions from the same point. One preferred embodiment of the present invention relates to automotive glazing laminates which are discussed in more detail below.

The practice of the present invention requires a convex, negative-image mold be constructed of the non-planar article to whose shape the heat-shrinkable, high modulus film is to be conformed. The negative-image mold may be constructed of any suitable material and by any method as long as the mold accurately reflects a negative image of the non-planar article. The mold must have means for holding the heat-shrinkable, high modulus film under dimensional restraint. Suitable means for dimensional restraint could include a series of vacuum apertures, or alternatively, mechanical clamps may be employed to hold the heat-shrinkable film in place.

To practice the present invention, a planar heat-shrinkable, high modulus film is first cut to the appropriate dimensions. The cut planar film is placed upon the negative-image mold of a non-planar article. Due to its high modulus, the cut planar film will typically wrinkle rather than follow the non-planar molding surface of the mold. The wrinkled film is held under dimensional restraint while being heated to a temperature above its glass transition temperature. Generally, this temperature will not exceed 250° C. The wrinkled heat-shrinkable film-will begin to shrink. Since it is held under dimensional restraint the shrinking film will conform to the mold surface by differential shrinkage of the excess film which forms the wrinkles in the film mass.

A mold release agent may optionally be interposed between the heat-shrinkable film and the negative-image mold prior to heat-shrinking. The choice of mold release agent will depend upon the mold surface and the type of heat-shrinkable film selected. The mold release agent may be applied to the mold, the heat-shrinkable film, or both. Preferably, the mold release agent may be coated onto the heat-shrinkable film.

A conformed film prepared as described above will be substantially wrinkle-free and will have substantially the same, if not exact, shape as the non-planar article employed to manufacture the negative-image mold. Thus, the conformed film may be inverted, properly aligned, and easily placed upon the corresponding non-planar article without additional wrinkling.

The above-described process is particularly suitable for conforming thermoplastic films into shapes having a compound curve.

The process of the present invention may be employed to manufacture a pre-laminate comprising a conformed film and a conformed adhesive layer bonded thereto. The pre-laminate can be prepared by producing the conformed film as described above. Once the heat-shrinkable film has been conformed to the shape of the negative-image mold, an adhesive layer or coating can then be applied to the wrinkle-free conformed film. The adhesive-coated film is subsequently-heated under pressure sufficient to conform the adhesive coating to the shape of the conformed film. Alternatively, the planar heat-shrinkable film can be first laminated to the adhesive layer and the pre-laminate formed by conformation on the negative-image mold as described above. In yet another possible embodiment, the adhesive may be placed or coated upon the non-planar article before the conformed film is placed into image-wise contact with the adhesive-coated non-planar article.

The particular adhesive chosen will depend upon the particular heat-shrinkable film employed and the nature of the laminate which is to be manufactured. Suitable adhesives include plasticized polyvinyl acetal resins such as polyvinylbutyral when heat-shrinkable polyester film is chosen as the heat-shrinkable film and the two-layer pre-laminate is to be laminated to glass.

DESCRIPTION OF A PREFERRED EMBODIMENT

The advantages of the present invention will be further illustrated by reference to the presently-envisioned preferred embodiment. As discussed briefly above, the present invention is particularly suitable for the manufacture of automotive glazing products, especially anti-lacerative automotive glazing products having at least one compound curve forming at least part of its surface.

Anti-lacerative automotive glazing products may be defined as those products having a protective anti-lacerative layer bonded to the inside surface of an otherwise conventional glazing product. Such anti-lacerative automobile glazing products are disclosed in U.S. Pat. Nos. 3,900,673 and 4,242,403, the disclosures of which are each expressly incorporated by reference herein.

The anti-lacerative layer comprises a (1) a relatively soft extensible plastic material, such as polyvinylbutyral, which is bonded to the otherwise conventional automotive glazing product; (2) a thinner layer of a more durable, higher modulus plastic such as polyethylene terephthalate; and (3) an even thinner layer of an abrasion resistant coating.

The process of the present invention is particularly suited to the manufacture of an anti-lacerative layer which will easily conform to a given compound curvature without wrinkling, and to non-planar automotive glazing units incorporating such anti-lacerative layers. The preferred process will be illustrated by reference to the fabrication of an anti-lacerative automotive glazing product having at least one compound curve.

It is likely that an automotive glazing manufacturer will practice the preferred embodiment of invention. Thus, rolls of planar, high modulus, heat shrinkable polyethylene terephthalate film and rolls of polyvinylbutyral will be shipped to the automotive glazing manufacturer.

A negative-image mold of the desired glazing unit must first be manufactured. The mold must have means for holding the heat-shrinkable polyester film along the periphery of the mold. Such holding means may be a series of apertures to which a vacuum is applied or may be a series of mechanical clamps or equivalent holding means.

The heat-shrinkable, high modulus polyester film has an abrasion-resistant coating applied to one side. The film may also have an adhesion promoting coating applied to its opposite side. The polyester film may also have a conductive coating, an infrared reflective coating or a thin metallic layer. The film may contain UV absorbers or dyes or these may be present in coatings on the film.

At the automotive glazing manufacturing site, the planar heat shrinkable polyester film is cut to the approximate dimensions of the curved automotive glazing unit to which it will be laminated. The cut film's dimensions should be larger than the automotive glazing unit since the film will shrink during the manufacturing process described below.

The cut heat-shrinkable planar polyester film is then placed upon the negative-image mold and secured with the side having the abrasion-resistant coating contacting the mold surface. The planar high modulus polyester film typically will not readily conform to the non-planar molding surface but instead will wrinkle, with the degree of wrinkling being dependent upon the complexity of the non-planar molding surface.

The wrinkled polyester film is then conformed to the curvature of the negative-image mold by heat-shrinking the film. The "conforming temperature" will generally not exceed 250° C.

The conformed polyester film is then placed into image-wise contact relationship with an automotive glazing prodict without formation of undesirable wrinkles. This is accomplished by inverting the negative-image mold so that the conformed film is facing downwards. The automotive glazing unit is then aligned underneath the mold and an adhesive layer of polyvinylbutyral is placed between the film and the automotive glazing product. The mold is then lowered until the exposed surface of the conformed film makes contact with the PVB layer, which is also makes contact with the concave glass surface of the automotive glazing unit. This pre-laminate will be heated under pressure to form the antilacerative glazing unit.

EXAMPLES

The practice and advantages of the present invention are further illustrated in the following Examples, which are intended to be illustrative only and in no way limit the scope of the claimed invention.

Example I

A plaster of paris negative-image mold of a portion of a Ford Taurus back window having a compound curvature was first prepared using conventional techniques.

A 2 mil thick planar sheet of heat-shrinkable HOSTAPHAN polyester film was then cut to the approximate dimensions of the negative-image mold, such that the edges of the cut film extended over the periphery of the mold. The cut polyester film was placed over the molding surface of the negative-image mold and held under dimensional restraint by taping the edges of the film to the periphery of the mold. The planar sheet of cut film did not easily conform to the shape of the molding surface and several wrinkles were formed in the film.

The negative-image mold was then placed in an oven maintained at 200° C. for approximately 20 minutes, at which time the mold was permitted to cool to room temperature. During the time the cut polyester film was held against the mold in the oven, it shrank and adapted itself to the compound curvature of the mold surface. The wrinkles which had been formed in the cut film were not present in the conformed film.

The conformed polyester film so prepared was separated from the negative-image mold, and easily placed into image-wise alignment with the Taurus back window. The film closely conformed to the complex curvature of the glass surface without any visible wrinkling.

Example II

A planar, biaxially oriented, heat shrinkable film of polyethylene terephthalate was placed over the convex surface of a 6 inch diameter watch glass having a nominal 4.0 inch radius of spherical curvature. The PET film was held under dimensional restraint against the convex surface by taping the edges of the film to the concave surface of the watch glass. The planar sheet of cut film did not easily conform to the convex surface of the watch glass and several wrinkles were formed in the film. The PET/watch glass assembly was placed in an oven maintained at 190° C. for approximately 30 minutes. During this time the heat-shrinkable PET film was substantially conformed to the convex surface of the watch glass. Most of the wrinkles which had been present in the cut film were not present in the conformed film.

A 40 mil thick sheet of polyvinyl butyral was draped over the concave surface of a second 6 inch diameter watch glass having a nominal 4.0 inch radius of spherical curvature. The conformed PET film was pressed against the PVB film by bringing the two watch glasses into a nested relationship, placing the nested watch glasses into a vacuum bag, and reducing the pressure to 25 inches of mercury. The vacuum-bagged assembly was placed in an autoclave, where it was subjected to a 60 minute programmed temperature and pressure cycle having a maximum temperature of 290° F. and a maximum pressure of 190 psi.

The vacuum-bagged assembly was brought to room temperature and atmospheric pressure and removed from the vacuum bag. The two watch glasses were separated, with the conformed PET film firmly bonded to the glass by the PVB.

The present invention is not limited to monolayer high modulus thermoplastic films. Heatshrinkable high modulus, multilayer coextruded films may also be used in the process of the present invention to produce substantially wrinkle-free thermoplastic films having at least one compound curve.

We claim

1. A process for the manufacture of a substantially wrinkle-free, non-planar pre-laminate comprising:
   (i) placing a heat-shrinkable, thermoplastic film over a negative-image mold of a non-planar article;
   (ii) conforming said film to the shape of said mold by heating said film to a temperature above its glass transition temperature while maintaining said film under dimensional restraint, thereby forming conformed film;
   (iii) placing an adhesive layer over said conformed film;
   (iv) conforming said adhesive layer to the shape of said conformed film by heating said adhesive layer under pressure, thereby forming a two layer pre-laminate.

2. The process of claim 1 wherein said heat-shrinkable film is selected from the group consisting of polyester films, polyolefin films, polyamide films, polyurethane films, polycarbonate films, polyvinyl chloride films, and polystyrenic films.

3. The process of claim 2 wherein said heat-shrinkable film is a polyester film.

4. The process of claim 1 wherein said non-planar article has at least one compound curve forming at least part of its surface.

5. The process of claim 1 wherein said film is heated to a maximum conforming temperature of about 250° C.

6. The process of claim 1 wherein a mold release coating is interposed between said film and said mold prior to heating said film.

7. The process of claim 6 wherein said mold release coating is affixed to said film.

8. The process of claim 7 wherein said mold release coating additionally improves the abrasion resistance of said film.

9. The process of claim 1 wherein said conformed film is cooled to below its glass transition temperature prior to placing an adhesive layer over said conformed film.

10. The process of claim 1 wherein said adhesive layer comprises a layer of polyvinylbutyral having a thickness effective to bond the conformed pre-laminate to glass.

11. A process for the manufacture of a non-planar laminate comprising:
    (i) placing a heat-shrinkable, thermoplastic film over a negative-image mold of a non-planar article;
    (ii) conforming said film to the shape of said mold by heating said film to a temperature above its glass transition temperature while maintaining said film under dimensional restraint, thereby forming conformed film;
    (iii) aligning the exposed surface of said conformed film into image-wise relationship with the concave surface of said non-planar article;
    (iv) placing an adhesive layer between said conformed film and said non-planar article, thereby forming a pre-laminate;
    (v) subjecting said pre-laminate to heat and pressure sufficient to laminate said conformed film, said adhesive layer, and said non-planar article together.

12. The process of claim 11 wherein said heat-shrinkable film is selected from the group consisting of polyester films, polyolefin films, polyvinyl chloride films, polycarbonate films, polyamide films, polyurethane films and polystyrenic films.

13. The process of claim 12 wherein said heat-shrinkable film is a polyester film.

14. The process of claim 11 wherein any excess material is trimmed from said conformed film prior to placing said film into image-wise alignment with said non-planar article.

15. The process of claim 11 wherein said non-planar article is transparent.

16. The process of claim 15 wherein said transparent non-planar article has at least one compound curve forming at least part of its surface.

17. The process of claim 16 wherein said transparent non-planar article is selected from the group consisting of glass, polycarbonate, and polyacrylate.

18. The process of claim 15 wherein said adhesive layer comprises a layer of polyvinylbutyral having a thickness effective to bond said conformed film to said transparent non-planar article.

19. The process of claim 11 wherein said film is heated to a maximum conforming temperature of about 250° C.

20. The process of claim 11 wherein a mold release coating is interposed between said film and said mold prior to heating said film.

21. The process of claim 20 wherein said mold release coating is affixed to said film.

22. The process of claim 21 wherein said mold release coating additionally improves the abrasion resistance of said film.

23. The process of claim 11 wherein said conformed film is cooled to a temperature below its glass transition temperature prior to contacting said film with said adhesive layer.

24. A process for the manufacture of a substantially wrinkle-free, non-planar pre-laminate comprising:
    (i) forming a pre-laminate of a heat shrinkable, high modulus thermoplastic film and an adhesive;
    (ii) placing said pre-laminate over a negative-image mold of a non-planar article such that said thermoplastic film contacts said negative-image mold; and
    (iii) conforming, by shrinking, said pre-laminate to the shape of said mold by heating said pre-laminate to a temperature above its glass transition temperature while maintaining said pre-laminate under dimensional restraint, thereby forming conformed pre-laminate.

25. The process of claim 24, wherein said heat-shrinkable thermoplastic film is selected from the group consisting of polyester films, polyolefin films, polyamide films, polyurethane films, polycarbonate films, polyvinyl chloride films, and polystyrenic films.

26. The process of claim 24, wherein said non-planar article has at least one compound curve forming at least part of its surface.

27. The process of claim 24, wherein said adhesive layer comprises a layer of polyvinylbutyral having a thickness effective to bond the conformed pre-laminate to glass.

* * * * *